United States Patent
Effenberger et al.

(10) Patent No.: US 11,992,993 B2
(45) Date of Patent: May 28, 2024

(54) CAMERA FOR MONITORING A TRANSFER

(71) Applicant: KRONES AG, Neutraubling (DE)

(72) Inventors: Harald Effenberger, Schierling (DE); Andreas Brunner, Aufhausen (DE); Christian Jendretzke, Hahnbach (DE); Thomas Hoellriegl, Teublitz (DE)

(73) Assignee: KRONES AG, Neutraubling (DE)

( * ) Notice: Subject to any disclaimer, the term of this patent is extended or adjusted under 35 U.S.C. 154(b) by 295 days.

(21) Appl. No.: 16/613,891

(22) PCT Filed: May 29, 2018

(86) PCT No.: PCT/EP2018/064022
§ 371 (c)(1),
(2) Date: Nov. 15, 2019

(87) PCT Pub. No.: WO2018/219918
PCT Pub. Date: Dec. 6, 2018

(65) Prior Publication Data
US 2021/0362395 A1   Nov. 25, 2021

(30) Foreign Application Priority Data
May 29, 2017   (DE) ..................... 10 2017 111 598.6

(51) Int. Cl.
*B29C 49/78* (2006.01)
*B29C 49/42* (2006.01)
(Continued)

(52) U.S. Cl.
CPC ........ *B29C 49/78* (2013.01); *B29C 49/42069* (2022.05); *B29C 49/46* (2013.01);
(Continued)

(58) Field of Classification Search
None
See application file for complete search history.

(56) References Cited

U.S. PATENT DOCUMENTS 5,866,175 A    2/1999   Latham
8,620,062 B2  12/2013   Kwirandt
(Continued)

FOREIGN PATENT DOCUMENTS

DE   102004051961         5/2006
DE   102004051961 A1      5/2006
(Continued)

OTHER PUBLICATIONS

English Translation of DE102012105005 (Year: 2012).*
(Continued)

*Primary Examiner* — Arrie L Reuther
*Assistant Examiner* — Virak Nguon
(74) *Attorney, Agent, or Firm* — Schmeiser, Olsen & Watts, LLP

(57) ABSTRACT

Provided is an apparatus for processing containers, in particular plastic containers and plastic parisons, including at least one processing device which processes the containers in a predetermined manner, and including at least one transfer device, which transfers the containers, individually, to the processing device in a transfer region and/or to which the containers are transferred from the processing device in a transfer region. At least one inspection device is provided, which is suitable and intended for visually inspecting at least a part of the processing device and or the transfer region at least at sections and completely, at least temporarily during a transfer process of a container.

20 Claims, 14 Drawing Sheets

(51) Int. Cl.
*B29C 49/46* (2006.01)
*B29L 31/00* (2006.01)

(52) U.S. Cl.
CPC ............... *B29C 2049/4697* (2013.01); *B29L 2031/7158* (2013.01)

(56) References Cited

U.S. PATENT DOCUMENTS

| | | |
|---|---|---|
| 2012/0089252 A1 | 4/2012 | Kwirandt |
| 2014/0298100 A1* | 10/2014 | Grimm .................. B29C 49/78 |
| | | 714/37 |
| 2014/0305076 A1* | 10/2014 | Winzinger .......... B29C 49/4252 |
| | | 53/201 |
| 2015/0037518 A1 | 2/2015 | Haner et al. |
| 2016/0023397 A1 | 1/2016 | Van Hamme et al. |

FOREIGN PATENT DOCUMENTS

| | | | |
|---|---|---|---|
| DE | 102012105005 | 12/2013 | |
| DE | 102012105005 A1 | 12/2013 | |
| DE | 102015215295 | 2/2017 | |
| DE | 102015215295 A1 | 2/2017 | |
| EP | 2604412 | 6/2013 | |
| EP | 2604412 A2 * | 6/2013 | ............. B29C 49/78 |
| EP | 2604412 A2 | 6/2013 | |

OTHER PUBLICATIONS

English translation of EP 2604412A2 (Year: 2013).*
International Search Report dated Aug. 21, 2018 for PCT/EP2018/064022.

* cited by examiner

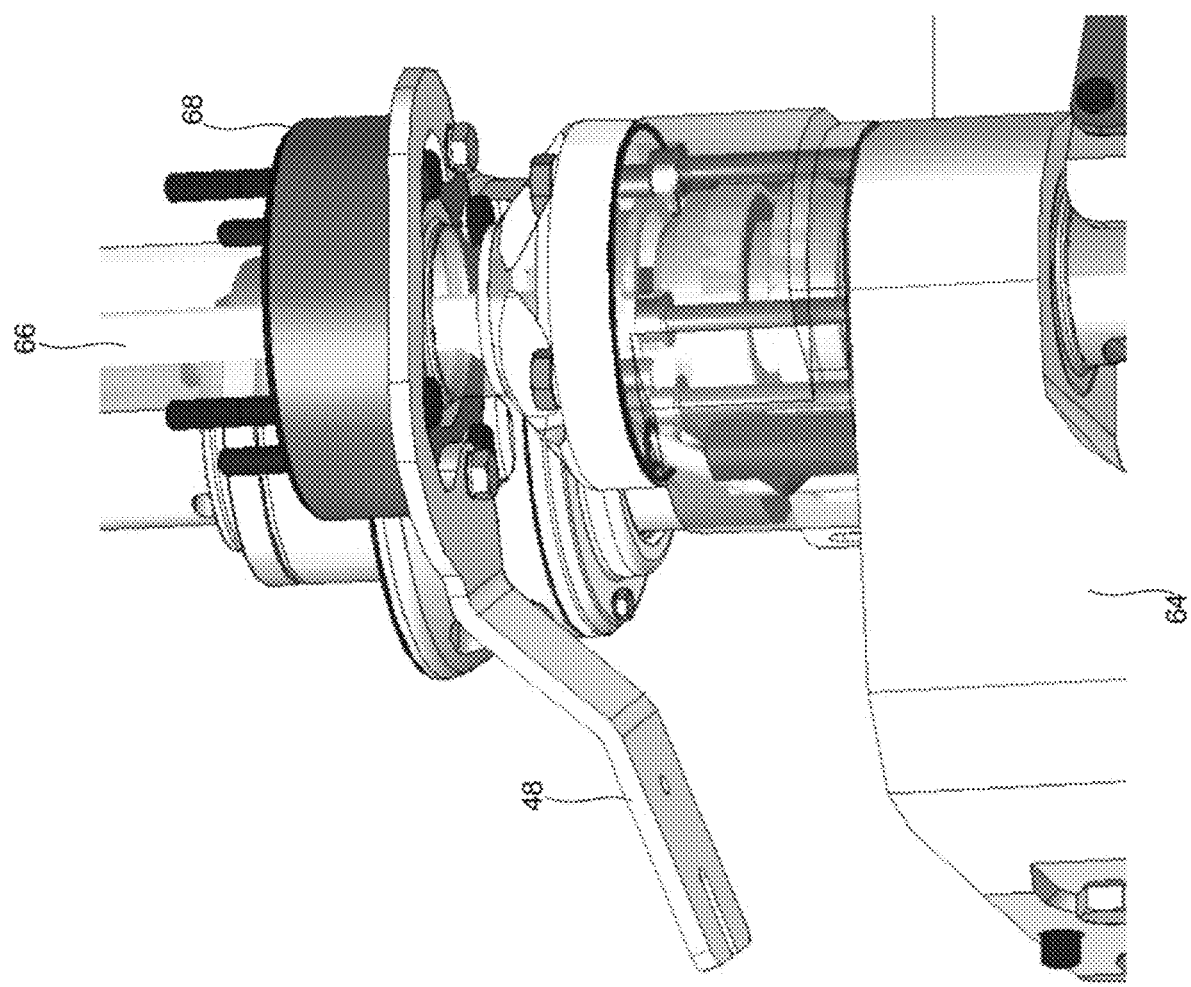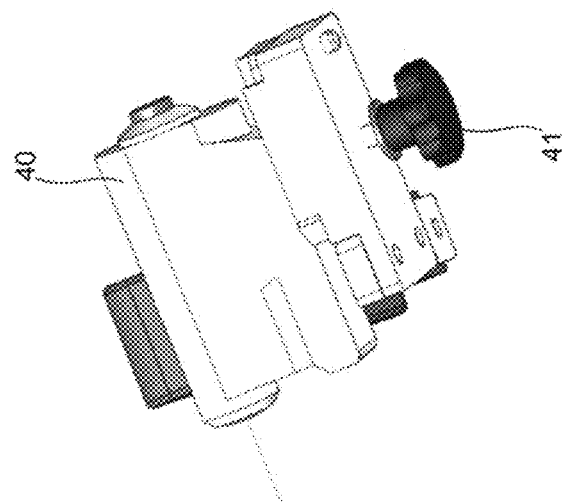
Fig. 8

CAMERA FOR MONITORING A TRANSFER

CROSS-REFERENCE TO RELATED APPLICATIONS

This application claims priority to PCT Application No. PCT/EP2018/064022, having a filing date of May 29, 2018, based on German Application No. 10 2017 111 598.6, having a filing date of May 29, 2017, the entire contents both of which are hereby incorporated by reference.

FIELD OF TECHNOLOGY

The following relates to an apparatus and a method for processing plastic containers, in particular plastic containers or plastic parisons and in particular for production thereof or for transforming of plastic parisons into plastic containers. Apparatus and methods for processing plastic containers or plastic parisons have been known for a long time from the known art.

BACKGROUND

Not only does the bottling of highly sensitive products themselves and also for instance products from the beverage and foodstuff industry usually take place under aseptic conditions, but also already at the time of production of the containers provided therefor, at least several of the processing steps are carried out inside a clean room. In the production of plastic containers it is known from the known art not to sterilise the finished plastic container only directly before filling, but already to sterilise the plastic parisons from which the plastic containers are obtained by a stretch blow moulding process, and to carry out the subsequent processing steps in a clean room. This procedure offers inter alia the advantage that the volume of a parison to be sterilised is substantially smaller than that of the finally blow moulded plastic container. This in turn makes it possible to minimise the setup space required for the installation of the apparatus and to provide short changeover times and changes of format.

The apparatus and methods which are currently known have the disadvantage that, due to the arrangement of several processing steps inside a chamber or in a clean room, also the transfer points at which the parisons or the containers are transferred to a processing chamber, for instance the blow moulding station, are also poorly visible for an operator of the apparatus. A manual adjustment at the transfer points during a setup operation of the apparatus or trouble-shooting consequently signifies not only an increased potential danger for the operator when he has to work in the machine, but is relatively elaborate and therefore entails downtimes in the event of any type of faults.

In the known art it is known that monitoring systems are used for container processing machines for the monitoring and control of the plastic parisons and containers themselves, for instance defects or contaminants, and also for recognition of faulty positioning.

SUMMARY

The object of the present invention is to overcome the disadvantages known from the known art and, while maintaining or further minimising an compact construction as possible of the apparatus, simultaneously to make it possible that changes to settings at the transfer of containers from a transfer device to a treatment device or vice versa can be implemented in the most time-saving and user-friendly manner possible.

An apparatus for processing containers, in particular plastic containers and plastic parisons, comprises at least one processing device which processes the containers in a predetermined manner, and at least one transfer device, which transfers the containers, individually or successively, to the processing device in a transfer region and/or to which the containers are transferred individually or successively from the processing device in a transfer region. The apparatus is one for the production of plastic containers, in which plastic parisons are advantageously expanded into plastic containers by means of a (stretch) blow moulding process. In this case containers may be understood below as both parisons and also containers finally blow moulded therefrom.

According to embodiments of the invention at least one inspection device is provided which is suitable and intended for visually inspecting at least a part of the processing device and/or the transfer region, at least temporarily, during a (if necessary potential) transfer process of a container. In particular a camera is provided for this purpose which can record spatially resolved images and video recordings of the transfer region. Alternatively, or in addition it is also conceivable that the inspection device is suitable and intended for visually inspecting at least in sections and in some embodiments, all of the transfer region.

In this case the transfer region is understood to be substantially that region of the apparatus in which the container is transferred from the transfer device to the processing device or in which the container is transferred from the processing device to the transfer device. In this region for instance elements of the processing device and elements of the transfer device can interengage. In this case the transfer region can be formed for example by the region of the apparatus in which both at least one element of the transfer device and also at least one element of the processing device contacts the container. Thus, in contrast to the known art, with regard to defects or contaminants the inspection device does not inspect or focus on the containers themselves, but on elements or regions of the apparatus itself.

The inspection device is suitable and intended for observing or inspecting the transfer region during a setup mode. The setup mode serves to adapt various components or elements of the apparatus, which participate indirectly and in some embodiments, exclusively directly in a transferring process of the container from the transfer device to the processing device and/or from the processing device to the transfer device, to one another or are orients them towards the respective other components in such a way that a transfer operation can be performed smoothly at high operating speed. Such adaptations can relate for instance to the relative arrangement of specific elements with respect to one another, such as for instance the distance of an element from a further element of the apparatus. However, such adaptations can also relate to the adjustments of specific movement sequences relative to one another, for instance the movement sequences of at least one transfer device relative to a further transfer device and/or one or more processing device(s). Actually, this can relate for instance to the setting of transport speeds of various transport devices or a setting of the relative transport distances of containers of a separating device.

The inspection device may record at least one video or a video sequence. This video or the recording may be transmitted, for example wirelessly and advantageously by means of wife, to a receiving device which comprises a display device and/or an operating device or is connected to the same. The receiving device or the display may be mobile or portable and can be carried for instance on the operator's wrist, which has an advantageous effect on the user friendliness. The receiving device can be an armband with a display and/or a laptop, a tablet and/or a smartphone. Live images are transmitted to the receiving device from the inspection device (such as from the inspection devices). These recordings of the inspection device can be recorded (outside the processing device) onto a memory card, or onto an SD memory card.

Each inspection device may be associated with (at least, and in some embodiments, precisely) one receiving device and in particular also at least one and precisely one display device.

The inspection device (or respectively inspection devices in each case) is (are) a camera, in particular an Action Cam. The inspection device may be suitable for recording more than 50 images per second, or in some embodiments more than 100 images per second, and in further embodiments more than 200 images per second and particularly at a maximum frame rate of 240 images per second.

It is also conceivable that the inspection device(s) inspect(s) at least one transfer region for instance at a time when no containers are being transferred. This may be aimed at observing exclusively the interengagement of individual elements of the apparatus, for instance the time-dependent relative arrangement of elements of the transfer device relative to elements of the processing device.

Furthermore, it is conceivable that the inspection device(s) is/are suitable and intended for inspecting at least a transfer region of the apparatus outside the production mode and in a specifically provided configuration mode or fault analysis mode. In a configuration mode or fault analysis mode for example at least elements of the apparatus can be operated at reduced speed or individual method steps may not be carried out. For example, in such a configuration mode or fault analysis mode in a sterilisation module the application of the sterilising agent such as hydrogen peroxide to the containers/parisons may not be carried out. This makes it possible for instance for inspection devices (cameras), which would be damaged for instance on contact with hydrogen peroxide, to be fitted inside the sterilisation chamber/inside the sterilising device.

A control device is provided which is suitable and intended for operating the apparatus in a configuration mode or fault analysis mode, in which for example the containers are transferred and/or transported at adapted (reduced) speed, and/or individual processing steps, which are performed on the containers of at least one processing device during the usual production mode (operation of the apparatus), are not carried out.

In other words, the inspection device is not aimed primarily at the inspection of the containers themselves, but at the movement and relative arrangement of the transfer device by comparison with the processing device. However, from the behaviour of the containers during their transfer it is also possible to draw conclusions about the relative movement or the relative arrangement of the transfer device by comparison with the processing device.

More than one, particularly, in some embodiments, at least two and advantageously more than three and particularly advantageously a plurality of inspection devices are provided which are in each case suitable and intended for visually inspecting the transfer region at least in sections and in some embodiments, completely, and in some embodiments at least temporarily, during a (if necessary potential) transfer process of a container.

By means of the inspection devices several transfer regions, in particular the transfer regions which are critical or prone to faults, can be inspected and the recordings can be particularly output on a display device. This offers the advantage that the monitoring and adjustment of all transfer regions can take place simultaneously.

The at least one inspection device(s) monitor(s) in particular regions of the apparatus which are selected from the group consisting of transfer points or transfer regions, lever positions, locks or tool positions and/or combinations of these.

In an advantageous embodiment at least one inspection device and in some embodiments several inspection devices is/are arranged inside a clean room. This is in particular advantageous if at least one processing device is (at least in sections) arranged inside a clean room. Advantageously the clean room surrounds the transport path of the containers (at least in sections and in some embodiments at least along at least one transfer region to be inspected) like a channel. Furthermore, this clean room is delimited by means of at least one wall relative to an unsterile surrounding.

The processing device may be particularly completely surrounded by a housing inside which advantageously aseptic conditions prevail. The inspection device may be arranged on an inner wall of this housing, particularly by means of a retaining device.

The attachment of an inspection device offers the advantage that for the operator the potential danger is reduced, since he no longer has to eliminate faults manually inside the apparatus. At the same time, however, a simultaneous monitoring, analysis and if necessary automatic correction of the apparatus parameters or the settings of the apparatus are carried out. Interference points in the apparatus can be improved or remedied, such as by the analysis of the recordings of the inspection device(s).

In a further advantageous embodiment, the transfer device is a feed starwheel and/or discharge starwheel associated with the processing device. Thus, the transfer process involves a starwheel transfer.

In a further advantageous embodiment, the processing device is a sterilisation module and/or a stretch blow moulding module.

In the case of (at least) one transfer device (particularly in the case several transfer devices), this may also be a transfer wheel, for instance a plastic parison transfer wheel which transports plastic parisons, or a so-called bottle transfer wheel which transports finally blow moulded bottles. Therefore the inspection device may be arranged and/or oriented in such a way that it inspects or records and thus monitors at least in sections, and in some embodiments completely, the transfer region from the transfer device, such as for instance a feed starwheel, into the processing chamber or into the processing module, for instance a sterilisation module or a stretch blow moulding module or a heating module, and/or from there to a transfer device such as a discharge starwheel.

Therefore the inspection device may be arranged and/or oriented in such a way that it inspects or records and thus monitors at least in sections and in some embodiments completely the transfer region from the transfer device, such as for instance a feed starwheel, into a blow moulding station or into a blow moulding, and/or from there to a transfer device such as a discharge starwheel.

In a further advantageous embodiment, the inspection device inspects the transfer region from below. The inspection device may be arranged below the transport plane or the transport path of the containers, that is to say the plane or the path along which the containers are transported (such as during the transfer process). However, it would also be conceivable that the inspection device inspects the transfer region from the side and/or from above.

In this instance the inspection device can be arranged substantially directly below the transfer region. However, it is not arranged directly below the transfer region, but is arranged at a fixed or in some embodiments at an adjustable angle. Therefore, the inspection device inspects the transfer region obliquely from below. Thus the inspection device advantageously encloses with the base normal (normal to the base surface (horizontal surface) of the apparatus) an angle which is in some embodiments less than 90°, in other embodiments less than 70°, in other embodiments less than 45° and in further embodiments less than 30°. This angle may be greater than 10°, in other embodiments greater than 30° and in further embodiments greater than 50°.

In a further advantageous embodiment, the at least one inspection device and in some embodiments all inspection devices are arranged stationary in the apparatus. Thus, this may be a stationary sensor system or system of inspection devices. Advantageously fixedly installed retaining means are provided, which are suitable and intended to remain, (at least also partially) together with the inspection device or with the inspection devices, permanently in the apparatus, in particular also after the test mode and/or setup mode is concluded, during the normal operation of the apparatus.

In a further advantageous embodiment the at least one inspection device and all inspection devices is/are arranged on an element of the apparatus which is moving (relative to the transport path of the containers), the processing device, and is/are mobile. For instance, at least one inspection device and several inspection devices are arranged on a blow moulding wheel of a blow moulding module of the apparatus. These are mobile inspection devices or a system of mobile inspection devices.

Particularly the inspection devices or at least one inspection device are/is moved rotationally (for instance by the processing device). However, also a translational movement and/or a combination of these is conceivable. Advantageously at least one and several inspection device(s) likewise moves at least in sections or at least temporarily along the transport path of the containers. However, at least some of the inspection devices can also be arranged stationary relative to the transport path of the containers.

A combination of a stationary inspection device or a stationary system of inspection devices with at least one mobile inspection device or a system of mobile inspection devices is also possible.

At least one inspection device or the inspection devices is/are arranged above the transport path of the containers on the processing device such as for instance the blow moulding module. For monitoring of a transfer region on or from a blow moulding station the inspection device can be arranged for instance on an adjacent blow moulding station. At least one and in some embodiments all inspection devices is/are arranged on the pivot bearing and advantageously on the housing of the respective blow moulding stations.

In a further advantageous embodiment, the inspection direction of the inspection device extends substantially in or contrary to the transport direction of the containers. The inspection device may be arranged or oriented in such a way that the inspection direction thereof (or camera position) extends substantially in the running direction (of the blow moulding wheel or the entrained containers). The inspection device can also be arranged or oriented in such a way that the inspection direction thereof (or camera position) extends contrary to the running direction (of the blow moulding wheel or the entrained containers). This is the case if a blow moulding module is provided as processing device, in other words if at least one transfer region inside a blow moulding module is to be inspected. Usually a blow moulding module has a blow moulding wheel with a plurality of blow moulding stations, in which in each case a (plastic) parison is expanded into a (plastic) container (bottle).

One inspection device may be provided for each blow moulding station. This can be arranged in such a way that it inspects at least (sections of) a transfer region of the blow moulding module, a transfer region in which a plastic parison is transferred from a transfer device such as a feed starwheel onto the respective associated blow moulding station, and/or (at least parts of) a transfer region in which the expanded plastic container is transferred from the blow moulding station onto a transfer device such as a discharge starwheel. In this case the inspection direction does not extend substantially parallel to the running direction of the blow moulding wheel or to the transport direction of the blow moulding station or of the container to be processed.

It is possible that the inspection device is arranged in such a way on the blow moulding station and has such a (wide) capture angle that it can inspect both the transfer region on which the plastic parison is transferred onto the blow moulding station, and also the transfer region on which the finally processed (expanded) container is removed from the blow moulding station (such as onto a transfer device such as for instance a discharge starwheel).

The inspection device can be arranged (rotationally and/or translationally) movably, advantageously rotatably and/or pivotably on the apparatus. It is for example also conceivable that the orientation of the inspection device is dependent on the angular position of the blow moulding wheel or blow moulding station, and the inspection direction of the inspection device in a first angular position of the blow moulding wheel or the blow moulding station extends in the direction of the first transfer region on which the plastic parison is transferred onto the blow moulding station, and in a second angular position of the blow moulding wheel or the blow moulding station extends in the direction of the second transfer region on which the finally processed (expanded) container is removed from the blow moulding station (such as onto a transfer device such as for instance a discharge starwheel).

However, at least one inspection device and particularly at least one inspection device for each blow moulding station is arranged in such a way on a blow moulding station of the blow moulding module and/or is oriented in such a way that it inspects the transfer region of at least one of the other blow moulding stations, particularly an adjacent blow moulding station. In other words, the inspection device arranged on a blow moulding station does not inspect a transfer region of this blow moulding station, but that of another blow moulding station, such as an adjacent blow moulding station of the blow moulding module. This offers the advantage that the inspection device can be arranged relatively compactly for instance above the blow moulds on the blow moulding station and comparatively short retaining means are sufficient for sufficient orientation of the inspection device on the region to be inspected.

In this case, as described above, the inspection direction of the inspection device can extend in the running direction of the blow moulding wheel and therefore the inspection device can for instance inspect a transfer region of a blow moulding station in front of it (such as directly in front in the running direction). If the inspection direction extends contrary to the running direction of the blow moulding wheel, it is provided that the inspection device inspects the transfer region of a blow moulding station following it and directly following it.

The inspection directions of at least one (in some embodiments, precisely one) inspection device for each blow moulding station of a blow moulding module extend either in the running direction of the blow moulding wheel or contrary to the running direction of the blow moulding wheel, that is to say all in the same orientation.

The inspection direction of at least one inspection device and preferred of all inspection devices extends substantially not in a horizontal plane, but at an angle of inclination different from this. The inspection device is inclined somewhat downwards. The angle of inclination which the inspection direction encloses with a horizontal plane (through the inspection device) is selected from a range between 5° and 45°, in other embodiments from a range between 10° and 30°, and this angle may be less than 20° in some embodiments. For each blow moulding station of the blow moulding module at least one further inspection device and all inspection devices have the same angle of inclination.

It is also conceivable that for each blow moulding station more than one, in some embodiments precisely two, or in further embodiments even more than two, inspection devices are arranged on a blow moulding module. Thus, for instance the inspection direction of a first inspection device of a blow moulding station could extend in the running direction of the blow moulding wheel and the inspection direction of a second inspection device of a blow moulding station could extend contrary to the running direction of the blow moulding wheel.

In a further advantageous embodiment (at least) one illumination device is provided such as on the inspection device or adjacent thereto, and illuminates at least a part of the processing device and/or the transfer region at least temporarily during a transfer process and/or an image recording of the inspection device. For each inspection device or on or adjacent to each inspection device at least one, and in some embodiments precisely one, illumination device is provided.

The illumination device illuminates the transfer region with diffuse light and/or with flashlight (advantageously stroboscopically) and/or with spotlighting, in which only a (narrow/sharp) delimited region (for instance substantially exclusively the transfer region or a section thereof) is illuminated (with comparatively high intensity). The illumination device is suitable for alternating between several illumination modes, for instance illumination with diffuse light and/or wide-angle illumination and/or flashlight illumination and/or spotlighting and/or a sports mode. Furthermore, in each illumination mode a different level of light intensity can advantageously be selected, in each case one with high power and one with low power.

The illumination device may have an LED as light source or several LEDs as light sources. It may have more than one light source, particularly in some embodiments at least two or at least three light sources (LEDs). Depending upon the selected illumination mode, one light source (one LED), two light sources (two LEDs) or even three light sources (three LEDs) are activated.

The at least one illumination device or the illumination devices is/are suitable in each case for providing a light intensity of at least 50 lumens, in other embodiments at least 100 lumens, further in other embodiments at least 150 lumens, further in other embodiments at least 150 lumens, further in other embodiments at least 200 lumens, further in other embodiments at least 250 lumens, further in other embodiments at least 300 lumens and in other embodiments at least 400 lumens.

The light angle of the illumination device can be chosen to have different values. Particularly a choice can be made between a narrow and a wide and/or an ultra-wide light angle. The light angle of the illumination device can be in the range between 60° and 80°, in other embodiments between 65° and 75° and in other embodiments between 70° and 75° (wide light angle). The light angle of the illumination device can be in the range between 20° and 60°, in other embodiments between 30° and 60°, in other embodiments between 40° and 50° and in other embodiments between 43° and 48° (narrow light angle). However, the light angle of the illumination device can also be greater than 70°, in other embodiments greater than 75° and in other embodiments greater than 80° or 90° (ultra-wide light angle).

The illumination time can be varied, it can be increased or decreased by at least a factor 2, or by at least a factor 4. The illumination device may be arranged on or (directly) adjacent to the inspection device. The illumination device may be arranged on the same retaining device on which the at least one inspection device is also arranged. The illumination device is arranged and/or oriented in such a way that it illuminates the region of at least one inspection device to be inspected (such as the inspection device associated with it).

In a further advantageous embodiment a mobile operating device can be provided, by means of which changes to settings can be carried out on at least one inspection device (such as on all inspection devices) and/or at least one processing device (in some embodiments, all processing devices) and/or the transfer device (in some embodiments, all transfer devices), and/or a mobile display device can be provided, by means of which data recorded by the inspection device can be output and/or displayed. Such an output or display takes place in real time. This offers the advantage that the operator can carry out changes to settings simultaneously or concurrently on the apparatus, in particular on the transfer device and/or the processing device, and receives an immediate feedback message concerning the effects of the changes to the settings. The data transmitted by the at least one and in particular by all inspection devices are stored. However, it would also be conceivable that this operating device is arranged stationary on the apparatus.

In a further advantageous embodiment, the apparatus has a storage device for at least temporary storage of recorded image sequences and/or film sequences. Thus, for instance the inspection device can have an image capturing device such as a camera and the image or film sequences recorded by this image capturing device or camera can be stored in the storage device. In this case it is conceivable that recorded image sequences or videos can be output by means of an output device. In particular in this instance a playback at slower speed (slow-motion replay) is possible in order thus to enable a better visual analysis of the recorded sequences. Output of individual images of an image sequence is also conceivable, or also a playback of a still image. In addition, a playback of extracts from recorded images on an enlarged scale is also possible. Such a slow motion replay can be obtained by a machine operator.

Changes to settings can be carried out on the transfer parameters which are selected from a group containing for instance the relative spacing and/or the angular position and/or speed of movement of the elements of the transfer device participating in the transfer relative to the elements of the processing device participating in the transfer, for example the spacing of the axes of rotation of a feed starwheel or of a discharge starwheel to the axis of rotation of a blow moulding wheel (or of a sterilisation module).

In a further advantageous embodiment the apparatus has a control device which is suitable and intended for (automatically and/or manually) carrying out, as a function of the data recorded by the inspection device, changes to the transfer parameters of at least one transfer device (in some embodiments, several transfer devices) and/or at least one processing device and in some embodiments several processing devices. In particular outside a clean room an evaluation device is provided, which identifies a defective image for instance from the images recorded by the inspection device(s) or can also evaluate or read specific transfer parameters such as the above-mentioned spacing of the axes of rotation or transfer elements relative to one another. In this case the evaluation device determines a deviation of the actual condition from a predetermined target condition, if the actual condition is still inside or already outside a tolerance range which is for instance likewise predetermined. A storage device is provided, in particular outside a clean room, in which predetermined actual conditions of the transfer parameters and any tolerance ranges are stored and can be retrieved by the evaluation device.

By the use of an optical sensor system a possibility or an aid is hereby created, which monitors points in the container processing machine which are difficult to see, in particular the above-mentioned transfer points, lever positions, locks or tool positions. In particular by means of defined parameters for instance changes to the machine parameters, mechanical changes or the like can be recognised, analysed and automatically eliminated by the system. Moreover, a correction can be instigated by means of a control panel, for instance in the mobile inspection system/sensor system, and in the event of an incorrect location of the transfer position(s) a manual setting can be carried out. As already described above, this sensor system can be mounted in both a fixed and also mobile manner, depending upon which point inside the machine is to be monitored and which type of installation is more advantageous for the respective monitoring point. Thus, for each operating setting, such as for instance the production mode, the maintenance mode and/or the changing mode, the optical inspection system/sensor system is located at the positions to be observed.

The at least one inspection device or the inspection devices is/are fixedly installed and cannot be moved in and/or out. Furthermore, a visual analysis with reference to the stored image material recorded by the inspection device can be carried out by the operator, in particular in slow-motion replay.

In a further advantageous embodiment, the inspection device is arranged on the apparatus by means of a clamp fastening, a screw fastening and/or a quick fastening (such as for instance a snap fastening).

A bayonet-type fastening or a snap fastening for instance would be conceivable as a quick fastening. These enable a relatively quick and also impermeable fastening of the inspection device on the apparatus and on the other hand such fastening also enables very fast removal. On the contrary, for fastening of the inspection device to the blow moulding station, for instance to the pivot bearing (housing) thereof, a clamp fastening may be advantageous by means of which the inspection device can be arranged on a rail on the blow moulding station. However, the retaining device of at least one inspection device can also have telescopic and/or rod-like arms which are rotatable or pivotable with respect to one another. Thus, an inspection direction or arrangement of an inspection device can be easily modified.

It is possible that at least one inspection device/camera must be removed from the apparatus during the production mode. In particular the camera or the inspection device cannot remain inside the housing or in the chamber during the production of hydrogen peroxide and cannot be used at this time. Therefore, in particular inspection devices provided in the sterilising device are arranged on the apparatus so that they are (quickly) removable.

Furthermore, embodiments of the present invention is directed to a method for monitoring and/or adjusting an apparatus for processing containers, in particular plastic containers and plastic parisons, with at least one processing device which processes the containers in a predetermined manner, and with at least one transfer device, which transfers the containers to the processing device in a transfer region and/or to which the containers are transferred from the processing device in a transfer region.

According to embodiments of the invention, by means of at least one inspection device at least a part of the processing device and/or the transfer region is visually inspected at least in sections and completely, at least temporarily during a transfer process of a container. In this case the method can be provided with all features described in connection with the apparatus individually or in combination with several of these features (and also vice versa).

The at least one inspection device transmits the data recorded by it or the inspection devices transmit the data recorded by them to a receiving device which is arranged outside a clean room and can have a display device and/or an operating device.

The method is a method in the setup mode and/or in the fault analysis mode and/or in a (format) changing mode of the apparatus. Particularly this is a method in the setup mode/for setting up the starwheel transfers, that is to say the transfer of a container from a feed starwheel to a processing device and/or the transfer of a container from a processing device of the apparatus to a discharge starwheel. The method is a method for fault analysis of the starwheel transfers. The method for fault analysis is particularly suitable in a test mode of the apparatus. In this case the apparatus can be operated at reduced operating speed. However, it is also possible to monitor and/or to test and/or to adjust the transfer processes at production speed.

In an advantageous embodiment the inspection device is arranged inside a clean room and at least one change to the settings is carried out on the inspection device and/or the transfer device by means of a particularly mobile operating device arranged outside the clean room, and/or by means of a particularly mobile display device arranged outside the clean room. The method comprises a control which automatically compares (setting) parameters of the inspection device with predetermined target parameter ranges and where appropriate, for instance in the event that the parameter values are outside a tolerance range, carries out changes to the apparatus automatically.

Thus, also in the context of the method according to embodiments of the invention, it is proposed that the (fine) adjustment for instance of the transfer parameters can be carried out by an operator of the apparatus outside the housing and in particular outside the clean room.

BRIEF DESCRIPTION

Some of the embodiments will be described in detail, with reference to the following figures, wherein like designations denote like members, wherein:

FIG. 8 shows a detail of the arrangement of the inspection device on the blow moulding station;

DETAILED DESCRIPTION

Figure 1:
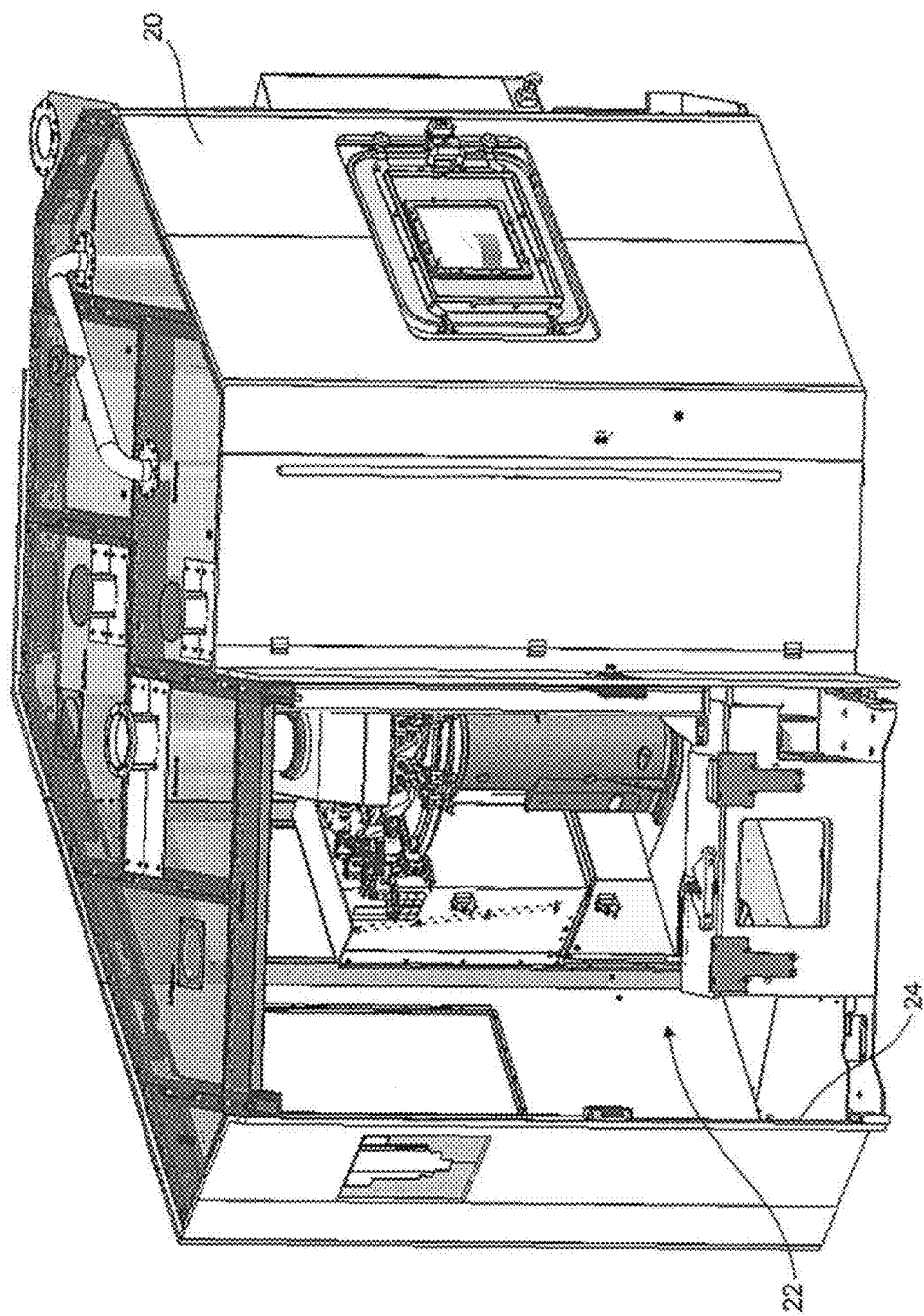
FIG. 1 shows a schematic representation of a processing device of an apparatus for processing plastic containers.

FIG. 1 shows a schematic representation of a processing device 20 of an apparatus 1 for processing plastic containers. This is introduced into a housing 24 in order to be able to provide in the interior thereof a clean room 22 in which the containers can be protected against external influences and can be processed under aseptic conditions. The objective is on the one hand to be able to provide the apparatus 1 overall in the most compact construction possible but on the other hand at the same time to be able to provide the highest possible user-friendliness for necessary settings and adjustments inter alia at the transfer points or transfer regions such as the starwheel transfers into the processing chamber 20 and the transfer to a blow moulding station 64 in the blow moulding module 60.

Figure 2:
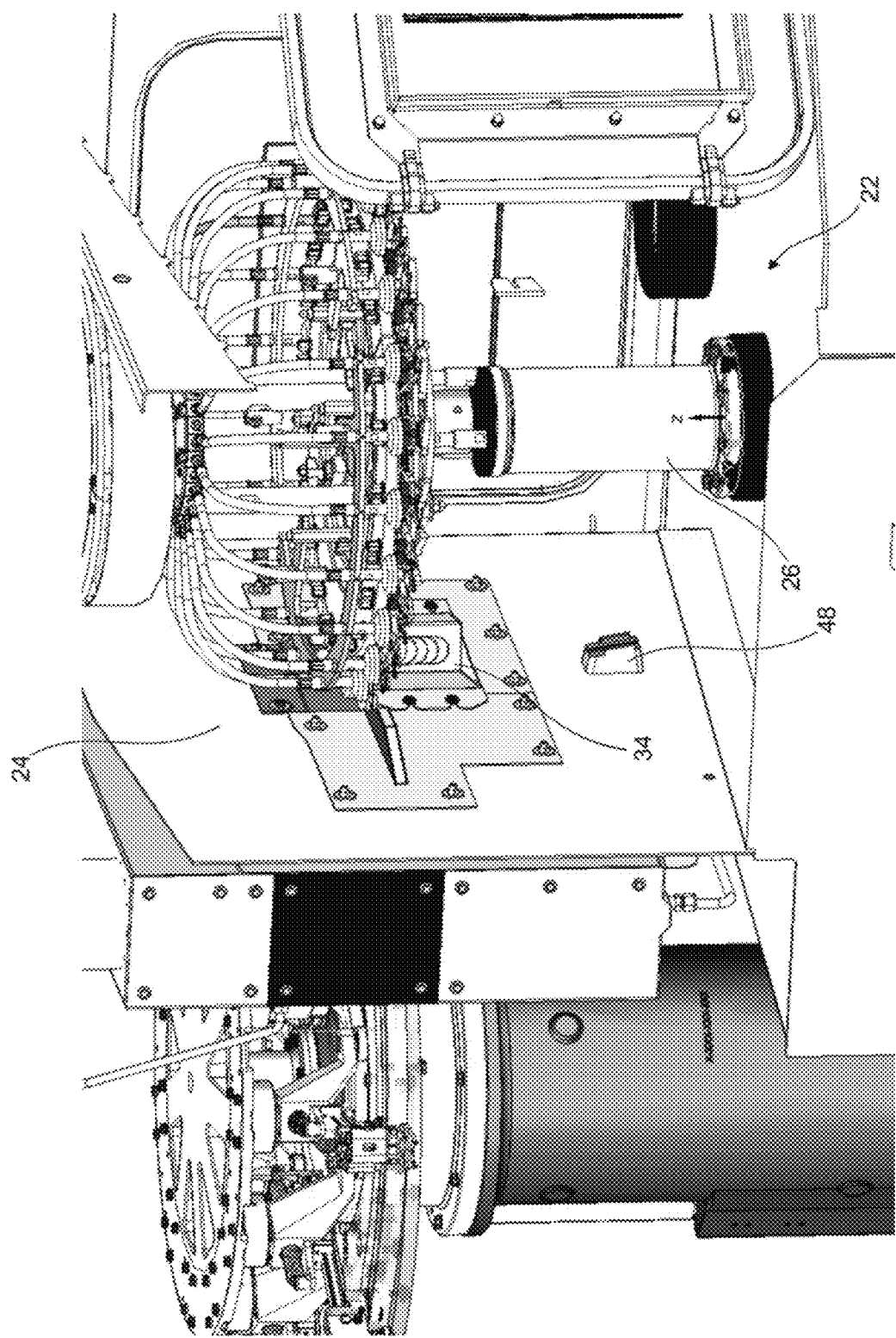
FIG. 2 shows a sectional representation of an embodiment of an apparatus for processing plastic containers.

FIG. 2 shows a sectional representation of an embodiment of an apparatus 1 according to embodiments of the invention for processing plastic containers in the view from a heating module of the apparatus 1 into a processing module 26, which may in particular be a sterilisation module, in which for instance the plastic parisons can be supplied with sterilising agent such as hydrogen peroxide. The drawing shows a processing device 20 with a housing 24, inside which a clean room 22 is formed during the production mode. A retaining device 48 (fixedly installed), on which an inspection device 40 (not shown in FIG. 2) can be fastened, is arranged on the inner wall of the housing 24. The retaining device 48 serves for (quick) fastening of the inspection device 40 to the apparatus 1. This offers the advantage that the inspection devices, which cannot remain in the sterilising device while hydrogen peroxide is being used therein, can be quickly arranged or removed if required. With the inspection device 40 it should be possible for the transfer point 34 of the containers into the processing module 20, in this case the sterilisation module, to be monitored by an operator located outside the housing 24.

Figure 3:
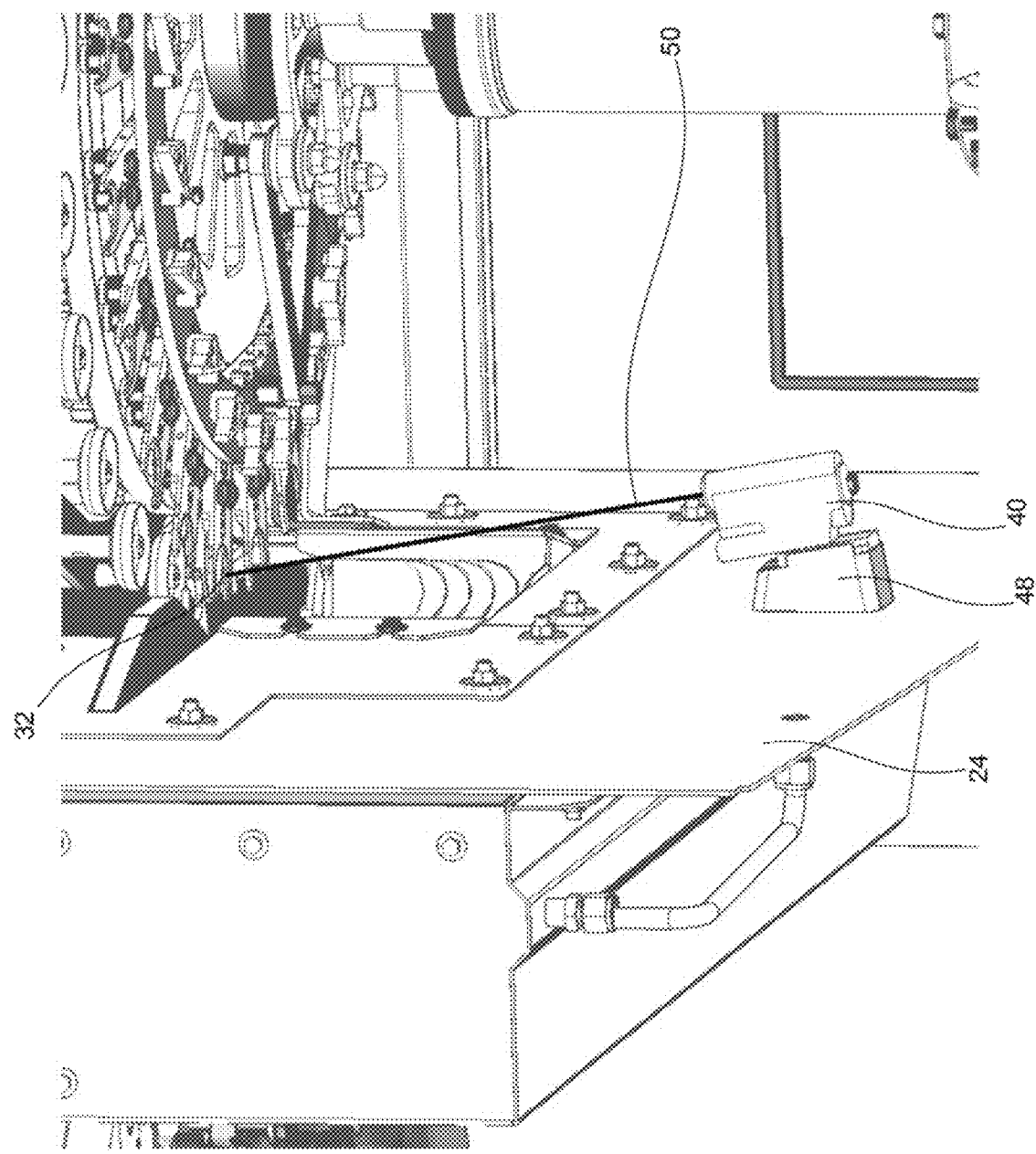
FIG. 3 shows a detail of the processing module with inspection device.

FIG. 3 shows a detail of the processing module 26 with inspection device 40, which can be pushed onto the retaining device 48 and is fixed thereto with a snap fastening. The retaining device 48 is arranged on the inner wall of the housing 24 in the region below the transfer region 32 between a transfer device 30 (not shown) and the processing device 20. In this case the inspection device 40 is arranged so that the inspection direction 50 thereof extends in a non-parallel manner to the inner wall of the housing 24 or also in a non-parallel manner to the normal to the ground surface, but obliquely from below inspects the transfer region 32 which may be located at least in sections in a recess or an opening in the housing 24.

Figure 4:
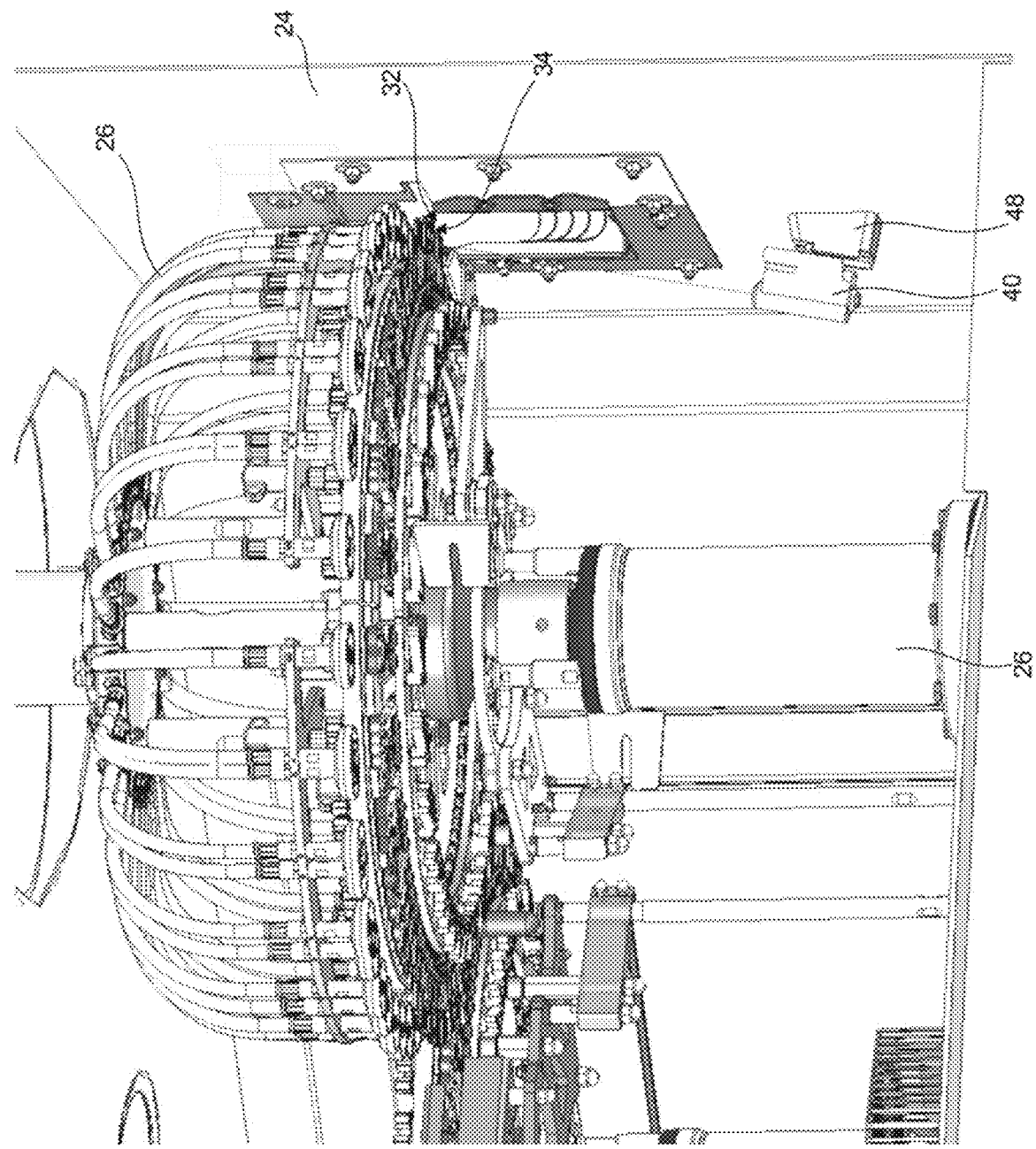
FIG. 4 shows a representation of a transfer from the processing module into the blow moulding module in an apparatus in a further embodiment.

FIG. 4 shows a representation of a transfer from the processing module 26, which may for instance be a sterilisation module, into a blow moulding module 60 of an apparatus 1 according to embodiments of the invention in a further embodiment. In turn, a retaining device 48, which may be fixedly fitted to the housing 24 and to which an inspection device 40 can be fastened, is arranged in a region of the inner wall of the housing 24 of the processing device 20. This retaining device is suitable and intended to receive, obliquely from below, the transfer region 32 or the transfer point 34 of the plastic parisons to the blow moulding module 60 or to a blow moulding station 64 of the blow moulding module 60.

Figure 5:
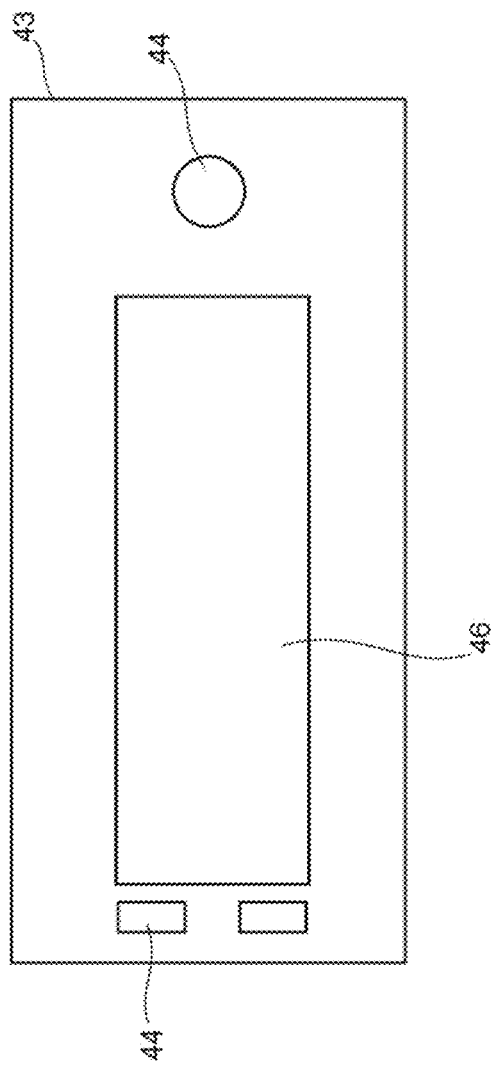
FIG. 5 shows a schematic representation of a receiving device.

FIG. 5 shows a schematic representation of a receiving device 43, to which the inspection device 40 transmits its recorded data or images or videos. There they can be displayed for the operator by means of a display device 46 in real time. Moreover, the receiving device 43 can have an operating device 44, by means of which the operator can perform settings on the apparatus 1 or the transfer parameters. In this case the desired changes are communicated by the receiving device 43, for example wirelessly, to the apparatus 1 or to the processing device 20 and/or to the transfer device 30. In this case the receiving device 43 can be configured in the manner of a wristwatch which can be worn on the wrist by the operator.

Furthermore, it is also possible that by means of the operating device 44 further settings are performed, such as in particular but not exclusively settings on the inspection device 40.

Figure 6:
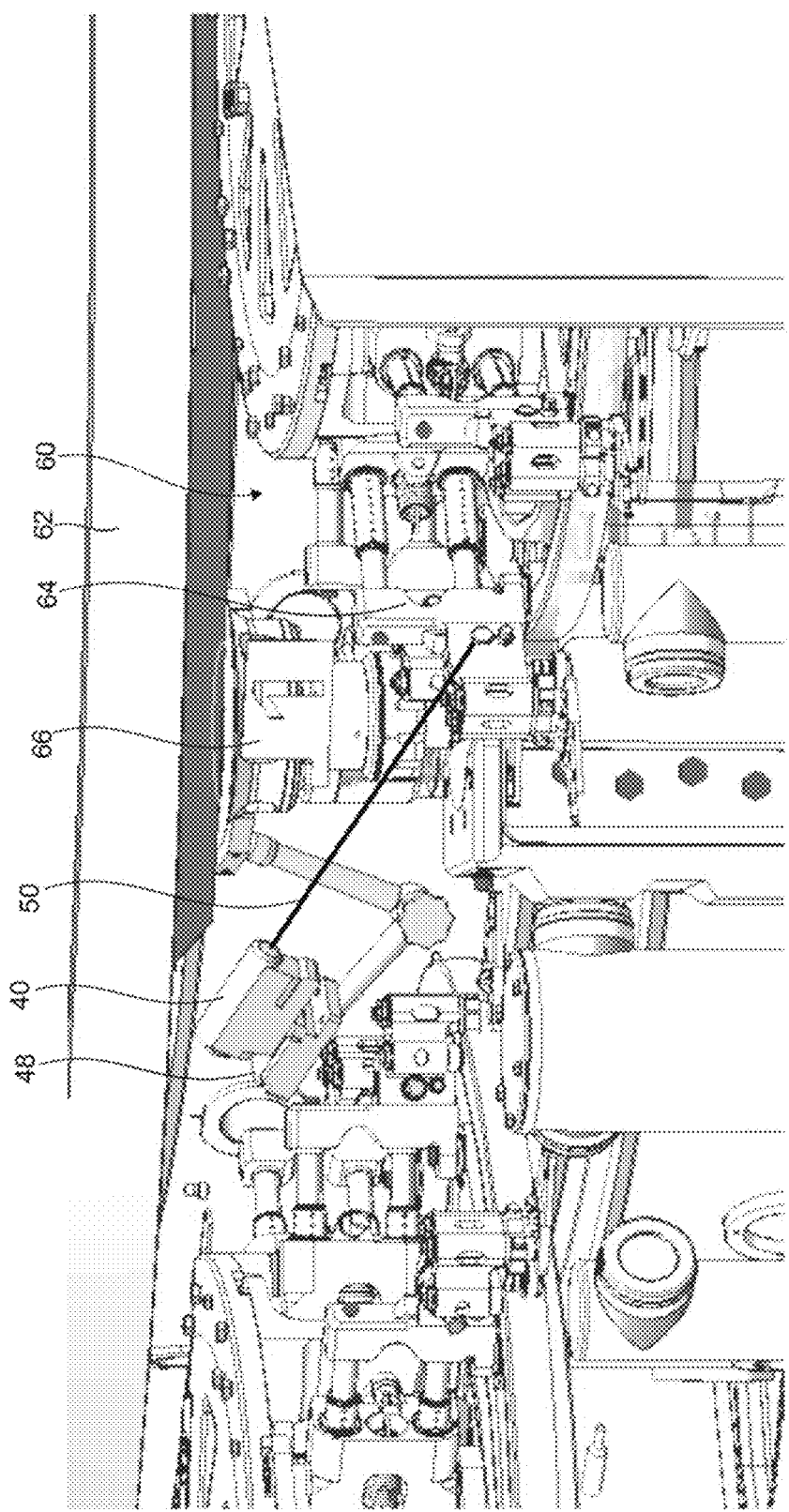
FIG. 6 shows a representation of a mobile inspection device on the blow moulding wheel.
Figure 7:
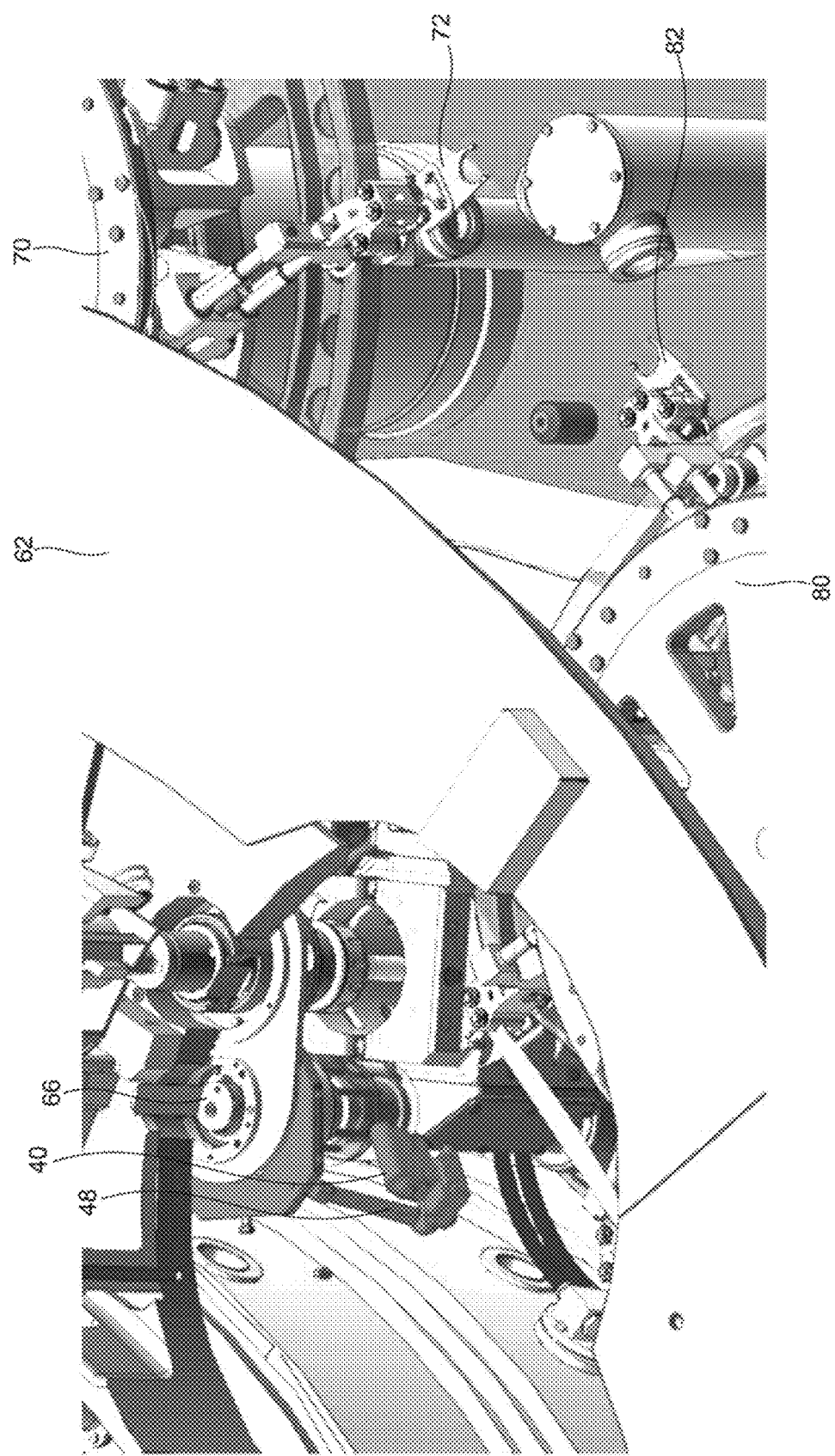
FIG. 7 shows a perspective representation of a mobile inspection device on the blow moulding wheel obliquely from above.

FIGS. 6 and 7 show a representation or a perspective representation obliquely from above of a mobile inspection device 40 on a blow moulding wheel 62 in a blow moulding module 60. The blow moulding module 60 has a blow moulding wheel 62 with a plurality of blow moulding stations 64 arranged thereon, to which plastic parisons are transferred separately and are expanded into containers in the respective blow moulding station 64. In this case the inspection device 40 is arranged on the pivot bearing 66, particularly on the pivot bearing housing 68, advantageously by means of a retaining device 48 which may be in the form of a retaining bar. In this case, at a predetermined angular position of the blow moulding station 64 at which the inspection device 40 is arranged, the inspection direction 50 of the inspection device 40 extends in the direction of the transfer region of the parisons on the delivery device 70. The delivery device 70 can be designed as a transfer wheel and by means of a plurality of holding receptacles 72 arranged thereon transports the parisons to the individual blow moulding stations 64 of the blow moulding module 60.

However, also at a predetermined angular position of the blow moulding station 64 on which it is arranged, the inspection direction 50 of the inspection device 40 extends in the direction of the transfer region of the finally blow moulded containers onto the discharge device 80. The discharge device 80 can be designed as a transfer wheel and by means of a plurality of holding receptacles 82 arranged thereon discharges the containers from the individual blow moulding stations 64 of the blow moulding module 60. In this case the inspection device 40 arranged on the blow moulding station 64 is entrained together with the plurality of blow moulding stations 64 around the axis of rotation of the blow moulding wheel 62 (rotationally), so that in this case this is a mobile camera/inspection device 40.

Figure 9:
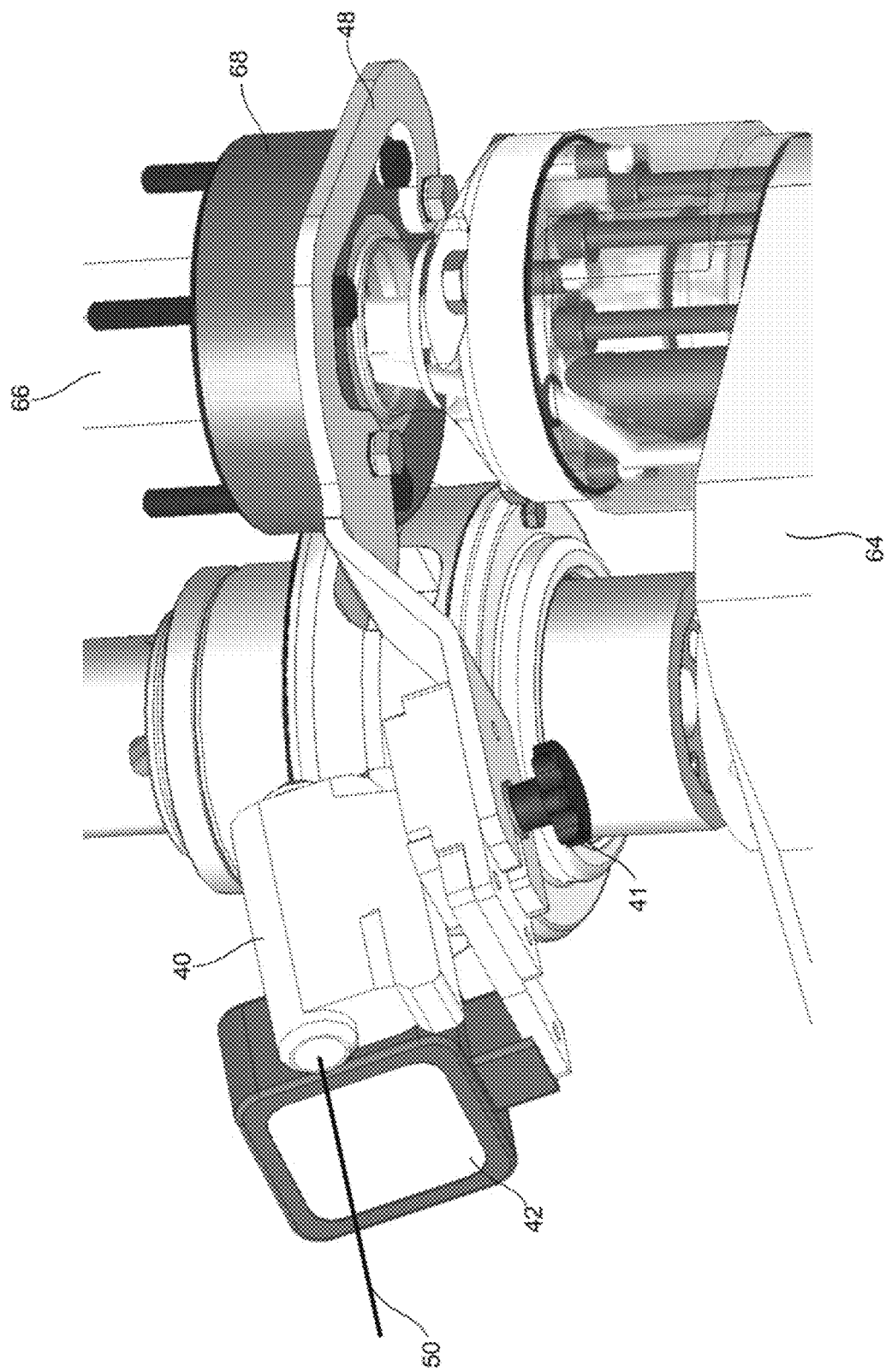
FIG. 9 shows a further detail of the arrangement of the inspection device on the blow moulding station.

FIGS. 8 and 9 each show a detail of the arrangement of the inspection device 40 on the blow moulding station 64. In this connection a retaining device 48 is provided which can be fixedly installed on the blow moulding station 64 and on the pivot bearing 66 and particularly on the pivot bearing housing 68 of the blow moulding station 64. The retaining device 48 can be designed in such a way that a quick fastening of the inspection device 40 on the retaining device 48 is possible, for example in that the inspection device 40 can be pushed onto the retaining device 48 and tightened by means of a star grip 41. Optionally an illumination device 42 (video light) can be arranged directly adjacent to the inspection device 40 on the retaining device 48. This illuminates the region of the apparatus 1 to be inspected by the inspection device 40.

Figure 10:
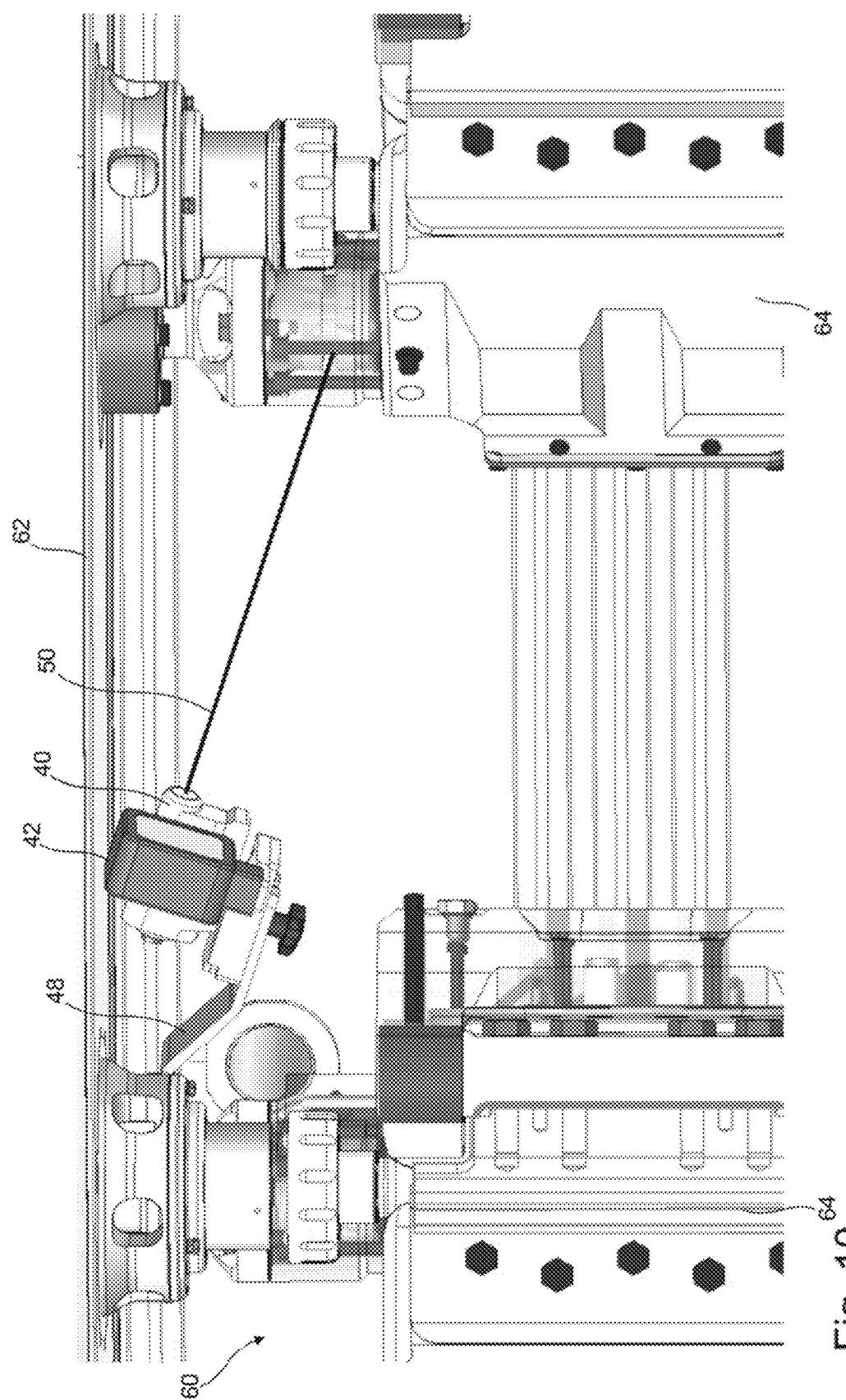
FIG. 10 shows a representation of a mobile inspection device on the blow moulding wheel with the inspection direction in the running direction.
Figure 11:
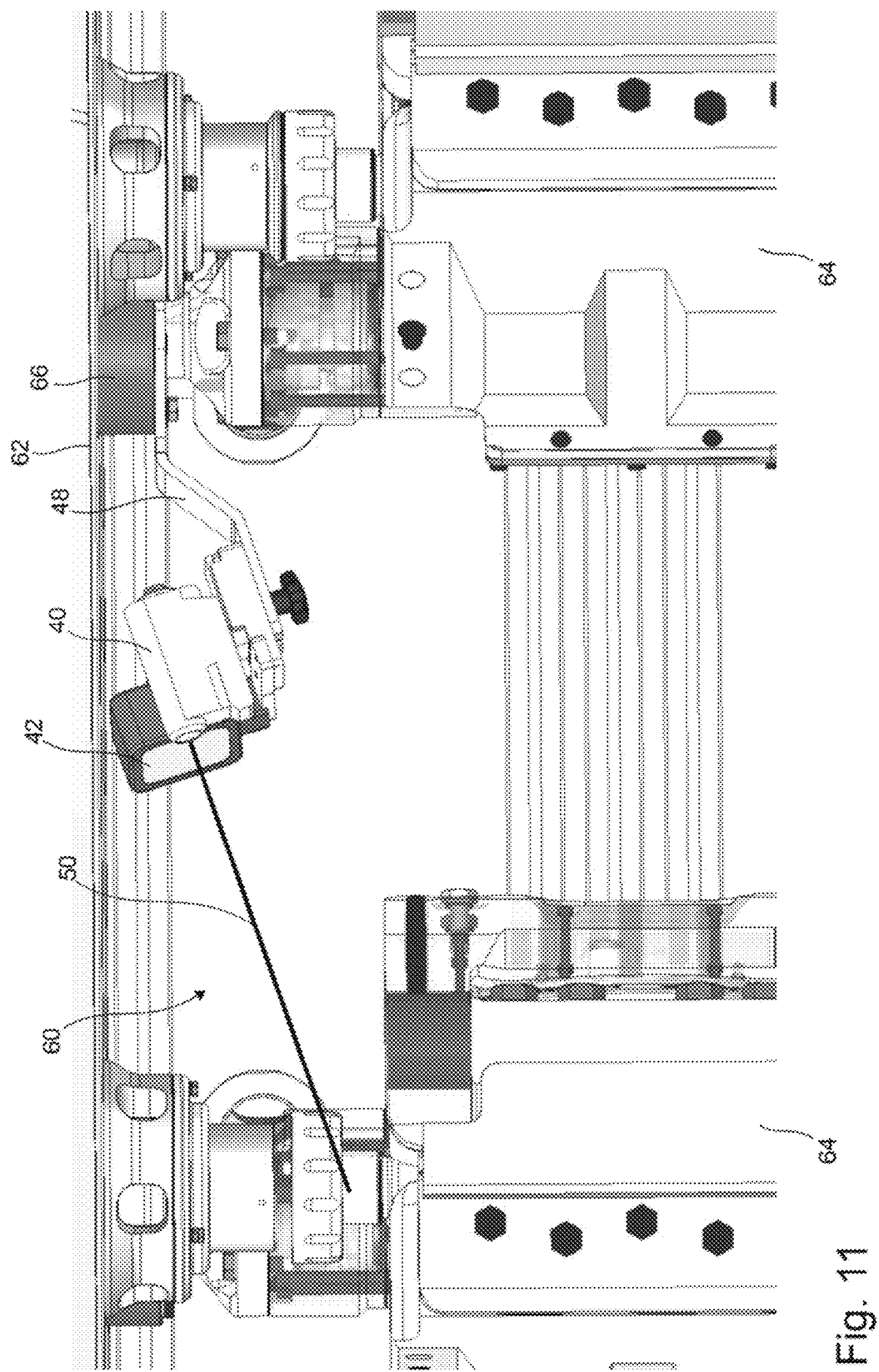
FIG. 11 shows a further representation of an embodiment of a mobile inspection device on the blow moulding wheel with the inspection direction contrary to the running direction.

The two FIGS. 10 and 11 each show a representation of an embodiment of a mobile inspection device 40 on the blow moulding wheel 62 in a blow moulding module 60 with the inspection direction 50, in the case of FIG. 10 in the running direction, and in the case of FIG. 11 contrary to the running direction of the blow moulding wheel 62 or the blow moulding stations 64 arranged thereon. In this case the blow moulding station 64 shown in FIGS. 10 and 11 in the left-hand region of the two figures moves on a portion of a circular path (out of the drawing plane in the direction of the observer and) towards the right (and then back again into the drawing plane), in the direction of the illustrated blow moulding station 64 in the right-hand region of the two figures. In this case in turn, optionally in addition to the inspection device 40, in order to ensure good lighting conditions of the region to be recorded an illumination device 42 can be provided which likewise can be arranged on the retaining device 48 of the inspection device 40.

Figure 12:
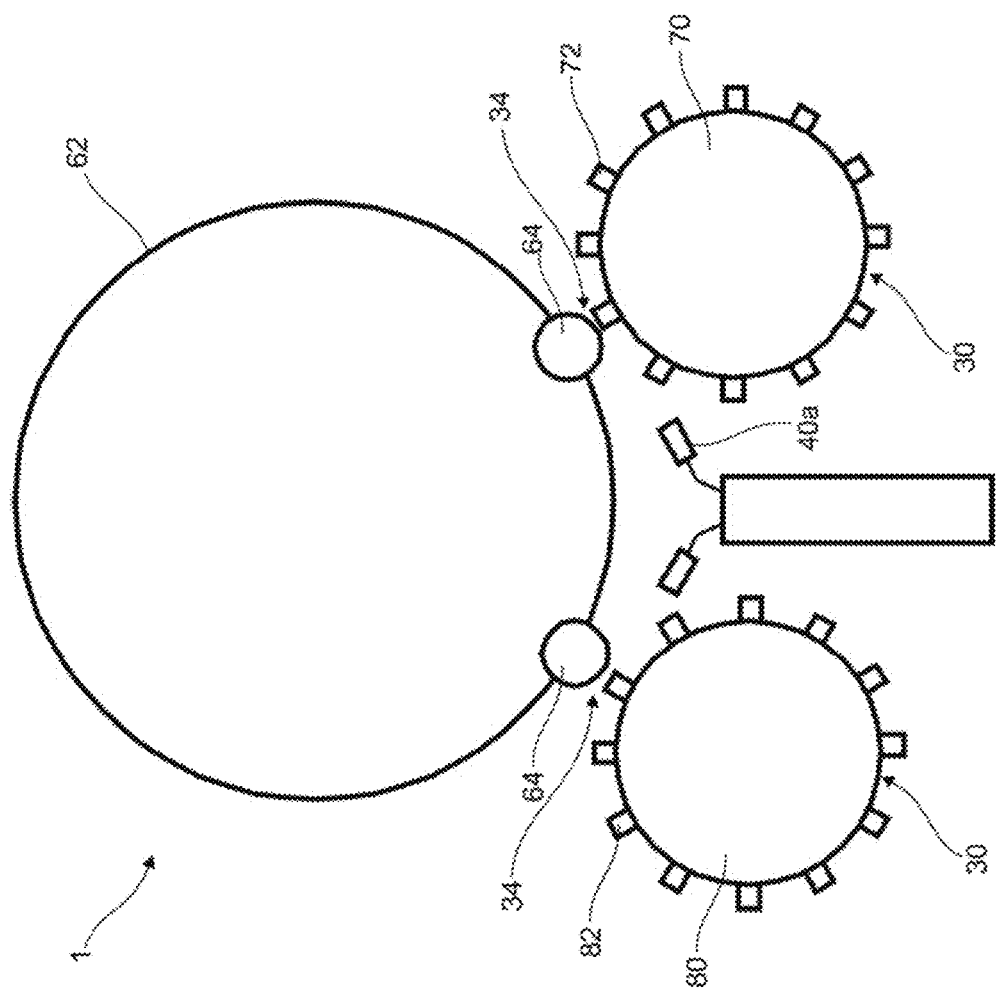
FIG. 12 shows a schematic representation of a further embodiment of an apparatus with stationary inspection devices.
Figure 13:
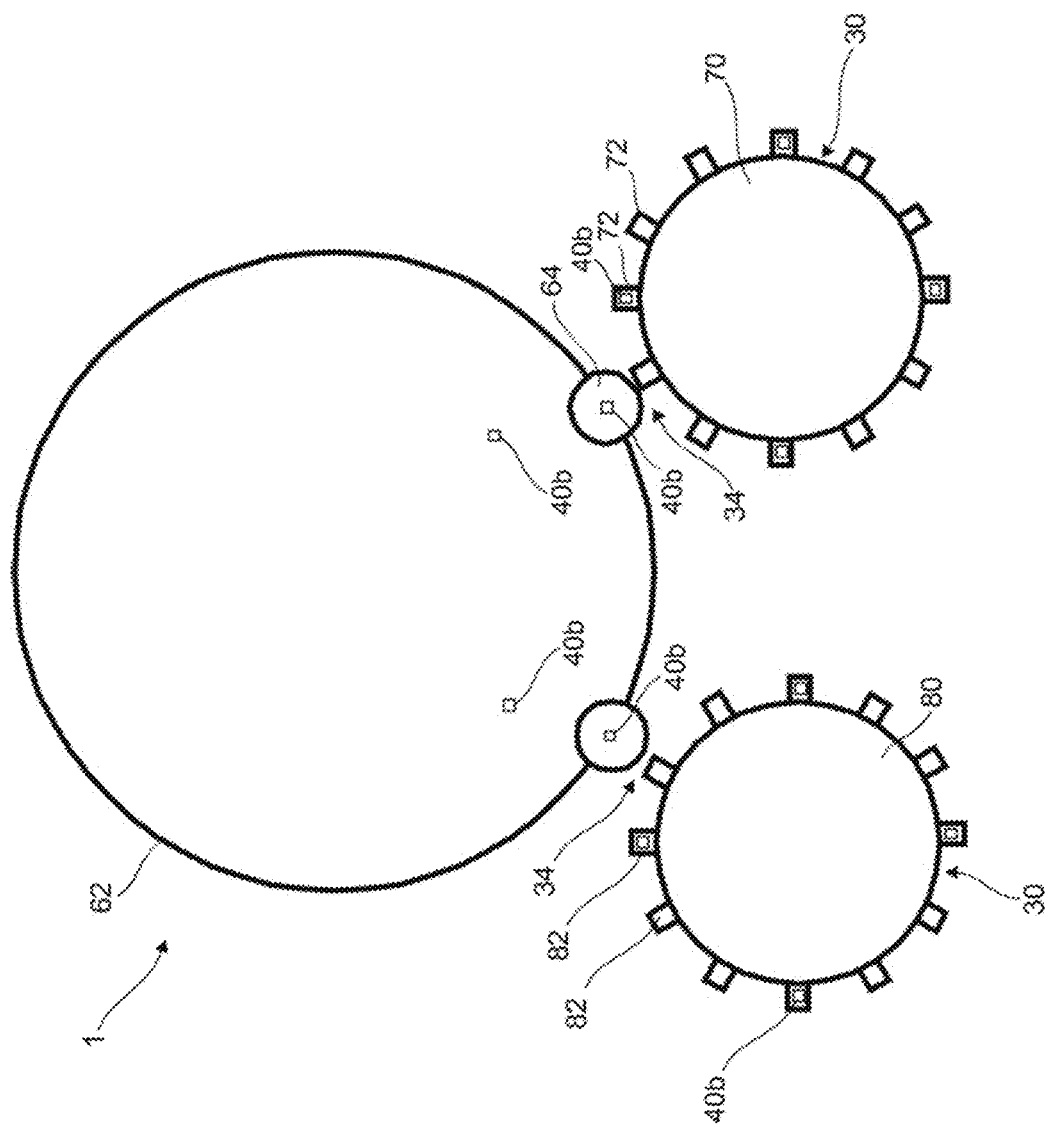
FIG. 13 shows a schematic representation of a further embodiment of an apparatus with mobile inspection devices.

FIGS. 12 and 13 each show a schematic representation of an embodiment of a further apparatus 1 according to embodiments of the invention. The reference 62 designates a blow moulding wheel in a blow moulding module 60, on which a plurality of blow moulding stations 64 are arranged. Inside each blow moulding station 64 a plastic parison is transferred to the respective blow moulding station 64 by a transfer device 30 which can be designed in the form of a feed starwheel 70 with retaining receptacles 72. Whilst the blow moulding wheel 62 rotates together with the blow moulding stations 64 arranged thereon about its axis of rotation, the plastic parison located in the blow moulding station 64 is expanded into a container (bottle) and is transferred from this processing device 20, the blow moulding module 60, to a further transfer device 30. The latter can likewise be designed as a transfer wheel, a discharge starwheel 80 with retaining receptacles 82 for the containers. In the case of FIG. 12 two inspection devices 40a which are immobile (that is to say arranged stationary in the apparatus 1) are provided for observation of the two transfer points 34, of which one is located at the transfer of the plastic parisons from the feed starwheel 70 onto the blow moulding wheel 62 or a blow moulding station 64 arranged thereon, and the other is located at the transfer of the finally blow moulded plastic containers from the blow moulding station 64 to the discharge starwheel 80. These, in some embodiments, do not move with the containers to be processed, not even in sections or temporarily. In this case the two stationary inspection devices 40a can be arranged between the feed starwheel 70 and the discharge starwheel 80. Only precisely two stationary inspection devices 40a may be necessary for each blow moulding wheel 62.

On the other hand, mobile inspection devices 40b are provided in the embodiment shown in FIG. 13. There are a number of possible arrangements for this. On the one hand they can be arranged on the blow moulding station 64 of the blow moulding wheel 62. However, they can also be arranged directly or additionally on the blow moulding wheel 62 itself. For each blow moulding station 64 a mobile inspection device 40b is arranged on the blow moulding station 64 and a further one is arranged on the blow moulding wheel 62 in the immediate proximity of this blow moulding station 64. One mobile inspection device 40b can then be used for monitoring the one transfer point 34 when receiving the plastic parisons and the second can be used for monitoring of the transfer point 34 when discharging the finally blow moulded containers onto the discharge starwheel 80. A further possibility is to arrange the mobile inspection devices 40b or at least one mobile inspection device on the (for example, rotating) transfer devices 30. For example, the mobile inspection devices 40b can be arranged on the retaining receptacles 72 of the feed starwheel 70 and/or the retaining receptacles 82 of the discharge starwheel 80. For each retaining receptacle 72/82 one mobile inspection device 40b is arranged in the feed starwheel 70 or in the discharge starwheel 80.

Figure 14:
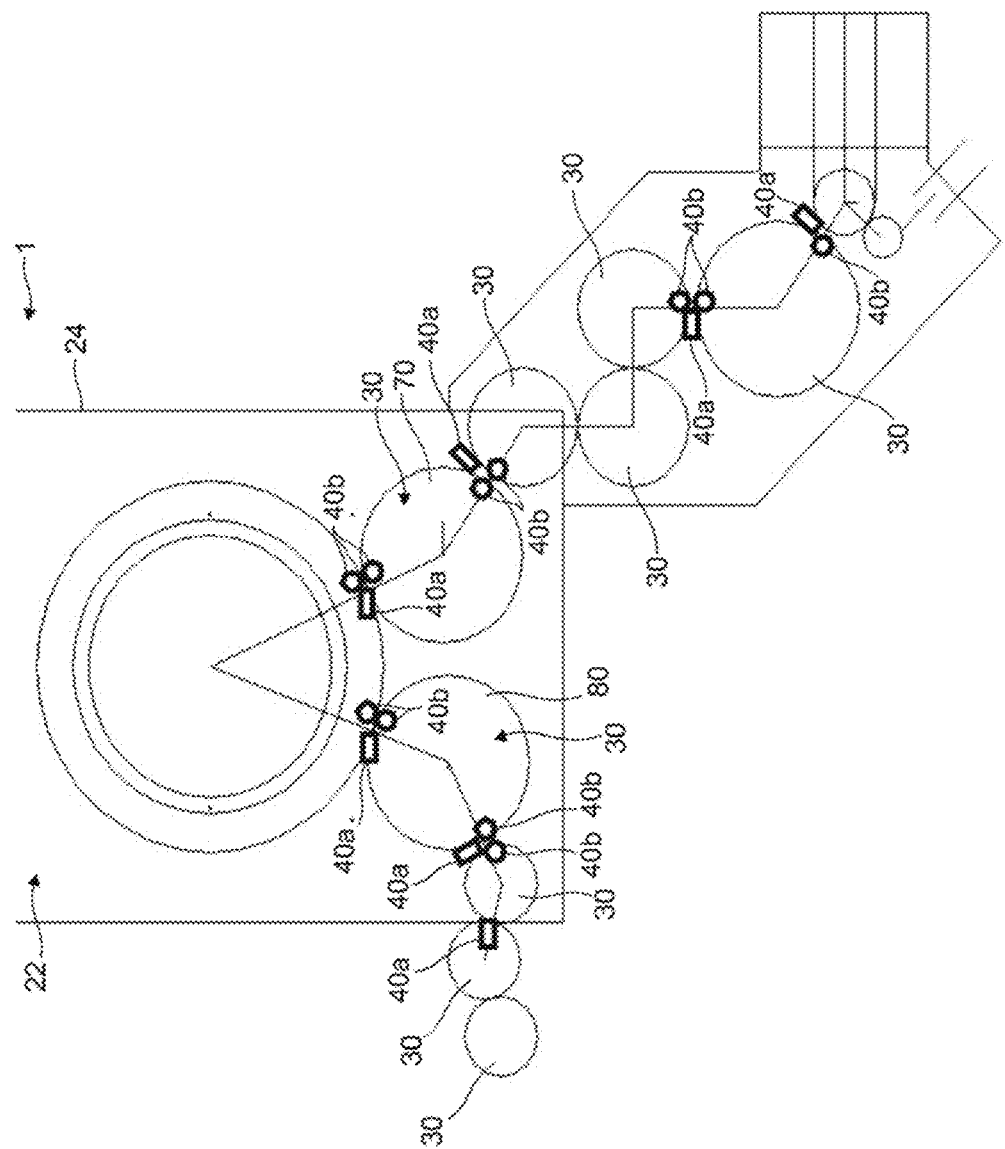
FIG. 14 shows a schematic representation of a further embodiment of an apparatus with an overall view of possible monitoring points.

Finally, FIG. 14 shows a schematic representation of a further embodiment of an apparatus 1 according to embodiments of the invention with several transfer devices 30 with an overall view of possible monitoring points 34 which can be monitored by means of stationary inspection devices 40a and/or by means of mobile inspection devices 40b. In this case a part of the transfer device is arranged inside a housing 24 in which a clean room 22 prevails.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

LIST OF REFERENCES 1 apparatus
20 processing device
22 clean room
24 housing
26 processing module
30 transfer device
32 transfer region 34 transfer point
40 inspection device
40a stationary inspection device
40b mobile inspection device
41 star grip
42 illumination device
43 receiving device
44 operating device
46 display device
48 retaining device
50 inspection direction
60 blow moulding module
62 blow moulding wheel
64 blow moulding station
66 pivot bearing
68 pivot bearing housing
70 delivery device
73 retaining receptacle
80 discharge device
82 retaining receptacle

The invention claimed is:

1. An apparatus for processing containers, comprising:
at least one processing device which processes the containers in a predetermined manner, and
at least one transfer device, which transfers the containers, individually, to the processing device in a transfer region and/or to which the containers are transferred from the processing device in the transfer region,
wherein at least one inspection device is provided, which visually inspects at least a part of the transfer region, at a time when no containers are being transferred, so that an interengagement of individual elements of the apparatus, including a time-dependent relative arrangement of elements of the transfer device relative to elements of the processing device, are observed, wherein the at least one inspection device inspects at least the part of the transfer region when the apparatus is outside a production mode and in a specifically provided configuration mode, and
wherein a control device is provided which operates the apparatus in a configuration mode, in which individual processing steps, which are performed on the containers of at least one processing device during the usual production mode, are not carried out.

2. The apparatus according to claim 1, wherein the transfer device is a feed starwheel and/or discharge starwheel associated with the processing device.

3. The apparatus according to claim 1, wherein the processing device is a sterilisation module or a blow moulding module.

4. The apparatus according to claim 1, wherein the inspection device inspects the transfer region from below.

5. The apparatus according to claim 1, wherein the at least one inspection device is arranged stationary in the apparatus.

6. The apparatus according to claim 1, wherein the at least one inspection device and all inspection devices are arranged and entrained on a moving element of the processing device.

7. The apparatus according to claim 1, wherein an inspection direction of the inspection device extends substantially in or contrary to the transport direction of the containers.

8. The apparatus according to claim 1, wherein an illumination device is provided on the inspection device or adjacent thereto, and illuminates at least a part of the processing device and/or the transfer region at least temporarily during an image recording of the inspection device.

9. The apparatus according to claim 1, wherein a mobile operating device can be provided, by means of which changes to settings can be carried out on the inspection device and/or the transfer device, and/or a mobile display device can be provided, by means of which data recorded by the inspection device can be output and/or displayed.

10. The apparatus according to claim 1, wherein the apparatus has an operating device arranged stationary on the apparatus.

11. The apparatus according to claim 1, wherein the apparatus has a storage device for at least temporary storage of recorded image sequences.

12. The apparatus according to claim 1, wherein the apparatus has a control device which is suitable and intended for automatically and/or manually carrying out, as a function of the data recorded by the inspection device, changes to the transfer parameters of the transfer device and/or the processing device.

13. The apparatus according to at least claim 1, wherein the inspection device is arranged on the apparatus by means of a clamp fastening or a quick fastening, wherein the quick fastening is a fastening that allows a fastening speed comparable to a speed of a bayonet-type fastening or a snap fastening.

14. The apparatus according to claim 1, wherein all inspection devices are arranged stationary in the apparatus.

15. The apparatus according to claim 1, wherein the at least one inspection device does not inspect or focus on the containers themselves, but on elements or regions of the apparatus itself.

16. The apparatus according to claim 1, wherein the least one inspection device is arranged on a blow moulding station of a blow moulding module and/or is oriented such that it inspects the transfer region of at least one other blow moulding station.

17. The apparatus according to the claim 16, wherein the at least one other blow moulding station is an adjacent blow moulding station.

18. An apparatus for processing containers, comprising:
at least one processing device which processes the containers in a predetermined manner, and
at least one transfer device, which transfers the containers, individually, to the processing device in a transfer region and/or to which the containers are transferred from the processing device in the transfer region,
wherein at least one inspection device is arranged inside a clean room and visually inspects at least a part of the transfer region at a time when no containers are being transferred, so that an interengagement of individual elements of the apparatus, including a time-dependent relative arrangement of elements of the transfer device relative to elements of the processing device, are observed, wherein the at least one inspection device inspects at least the part of the transfer region when the apparatus is outside a production mode and in a specifically provided configuration mode, and
wherein a control device is provided which operates the apparatus in a configuration mode, in which individual processing steps, which are performed on the containers of at least one processing device during the usual production mode, are not carried out.

19. A method for monitoring and/or adjusting an apparatus for processing containers, the method comprising:
processing, by at least one processing device which processes the containers in a predetermined manner, and transferring, by at least one transfer device, which transfers the containers to the processing device in a transfer region and/or to which the containers are transferred from the processing device in a transfer region, wherein by means of at least one inspection device at least in sections and completely at least a part of the transfer region is visually inspected at a time when no containers are being transferred, so that an interengagement of individual elements of the apparatus, including a time-dependent relative arrangement of elements of the transfer device relative to elements of the processing device, is observed, wherein the at least one inspection device inspects at least the part of the transfer region when the apparatus is outside a production mode and in a specifically provided configuration mode, and wherein the apparatus also operates in a configuration mode, in which individual processing steps, which are performed on the containers of at least one processing device during the usual production mode, are not carried out.

20. The method according to claim 19, wherein the inspection device is arranged inside a clean room and changes to the settings are carried out automatically and/or manually on the inspection device and/or the transfer device by means of a particularly mobile operating device arranged outside the clean room, and/or by means of a particularly mobile display device arranged outside the clean room.

* * * * *